T. C. Purington,

Grape Crusher.

No. 88,329. Patented Mar. 30, 1869.

Witnesses.
Huer Turnbull
C. H. Disney

Inventor
T. C. Purington
by C. Wm Smith
Atty.

TURNER C. PURINGTON, OF LINCOLN, CALIFORNIA.

Letters Patent No. 88,329, dated March 30, 1869.

IMPROVEMENT IN GRAPE-CRUSHER AND STEM-SEPARATOR.

The Schedule referred to in these Letters Patent and making part of the same.

*To all whom it may concern:*

Be it known that I, TURNER C. PURINGTON, of Lincoln, in the county of Placer, and State of California, have invented an Improved Grape-Crusher and Stem-Separator; and I do hereby declare that the following is a full and exact description of the same, reference being had to the accompanying drawings, and to the letters of reference marked thereon.

The object of my invention is to provide an improved machine for expressing the juice from the grape, without crushing the seeds, or allowing the stems to pass into the vat, and thereby impart a bitter and acrid taste to the wine after fermentation.

My invention consists in attaching, to a suitable frame-work, a box, or mill of the desired dimensions, with transverse bars on the circle of an arc, and having openings between the bars. A half oval crusher is caused to operate back and forth in the arc, which separates the stems and crushes the fruit, allowing the juice and pulp to pass through the slotted openings below, while the stems are removed, by means of the crusher, through an opening at one end of the machine, without any considerable portion of the debris falling into the vat with the expressed juice. The fruit is fed through a hopper at the top of the machine with one hand, while with the other hand the operator turns the crank.

Referring to the drawings—

Figure 1:
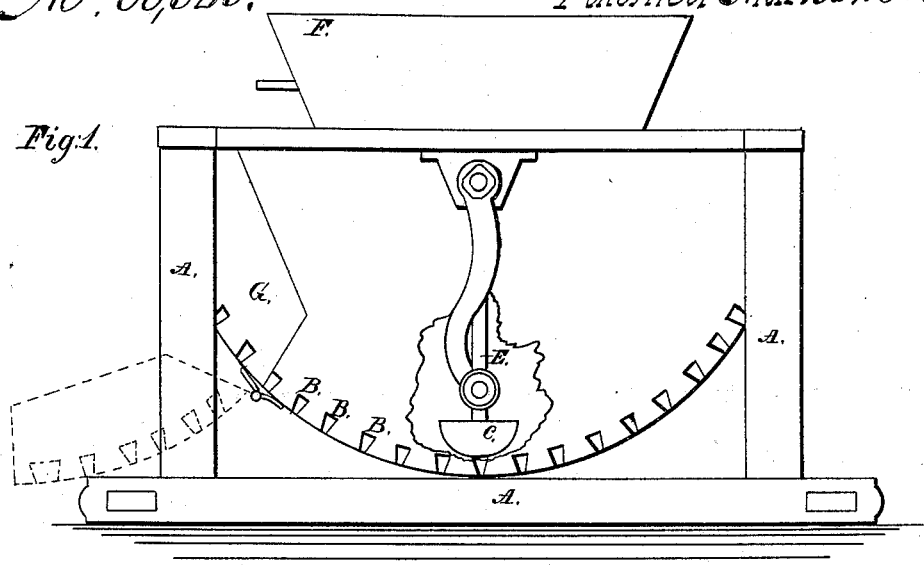
Figure 1 is a side elevation, with a portion of the machine broken away to show the crusher, and the door through which the stems and debris are removed, dropped, shown by dotted lines.
Figure 2:
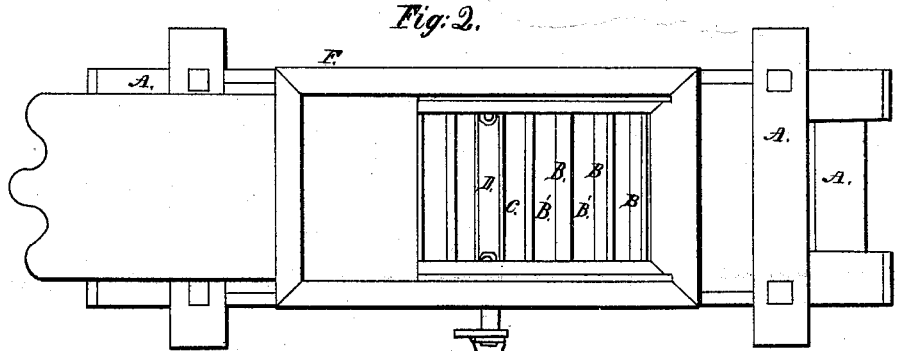
Figure 2 is a plan, with slide withdrawn.
Figure 3:
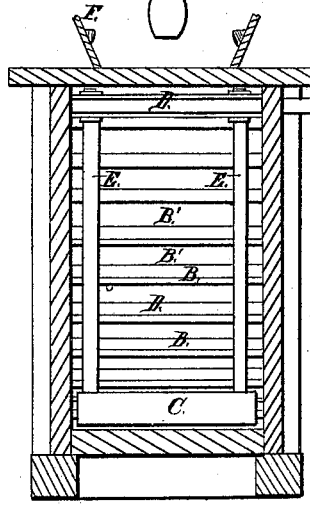
Figure 3 is a top view, with the crusher elevated for a backward stroke.

A A A is the frame to which the mill is attached, the bottom of which is a segment of a circle. Transversely across the bottom are placed bars B B, held by dovetailed attachments to the sides of the box, whereby spaces, or openings B' B' are formed, through which the pulp and expressed juice from the fruit fall free from stems into a vat beneath. These openings may be somewhat varied in width, but should not be made so wide as to admit a whole grape without crushing. I think spaces of about one-fourth of an inch will be sufficient for the purpose.

The crusher C, is a half oval in shape, to be constructed of wood, and is attached rigidly to the axis, or shaft D, by arms E E, having set-screws to raise the crusher or lower it, at will. The crusher moves sufficiently near the cross-bars to impart to the fruit a crushing effect.

It is intended to operate my machine by hand-power, but it may be worked by other power, with the necessary appliances to impart to the crusher a reciprocating motion.

In operating my machine, the grapes are fed through the hopper F, and the mill may be nearly filled before crushing is commenced, when, by a to-and-fro motion, or movement of the crusher, the grapes will be rapidly removed from the stems, and fall upon the grated bottom, where they are crushed without breaking the seeds, while the stems remain above the crusher. When the chamber becomes too full of stems, the door G is let down, and by the movements of the beater they are expelled, after which crushing is again commenced.

By the use of my machine, one hundred pounds of grapes can be crushed and stemmed by one person, in three minutes, making the device a very cheap and desirable machine for wine-growers.

Having thus described my invention,

What I claim, and desire to secure by Letters Patent, is—

1. The half oval crusher C, attached to the shaft D by the arms E E, and imparting to it a reciprocating, or to-and-fro movement, whereby the grapes are deprived of their stems, and crushed beneath upon the grated bottom of the machine, substantially as described.

2. The combination and arrangement of the grated bottom B B B' B', with the crusher C, substantially as and for the purpose specified.

In witness whereof, I have hereunto set my hand and seal.

TURNER C. PURINGTON. [L. S.]

Witnesses:
T. B. HARPER,
A. H. ESTELE.